(12) United States Patent
Chen et al.

(10) Patent No.: US 12,712,666 B2
(45) Date of Patent: Aug. 18, 2026

(54) LOW-DENSITY PARITY-CHECK RATE MATCHING IN COMMUNICATION SYSTEMS

(71) Applicant: Intel Corporation, Santa Clara, CA (US)

(72) Inventors: Xiaogang Chen, Portland, OR (US); Shlomi Vituri, Tel Aviv (IL); Qinghua Li, San Ramon, CA (US); Thomas J. Kenney, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/838,675

(22) Filed: Jun. 13, 2022

(65) Prior Publication Data

US 2022/0303052 A1 Sep. 22, 2022

(51) Int. Cl.
*H04L 1/00* (2006.01)
*H04L 27/36* (2006.01)

(52) U.S. Cl.
CPC .......... *H04L 1/0061* (2013.01); *H04L 1/0071* (2013.01); *H04L 27/36* (2013.01)

(58) Field of Classification Search
CPC ..... H04L 1/0061; H04L 1/0071; H04L 27/36; H04L 1/0003; H04L 1/0009; H04L 1/0057
See application file for complete search history.

(56) References Cited

U.S. PATENT DOCUMENTS 9,021,341 B1 * 4/2015 Srinivasa .............. H04L 1/0033 714/790
9,722,730 B1 * 8/2017 Huang .............. H04L 25/03891
2018/0212626 A1 * 7/2018 Chen .................. H03M 13/1102
2020/0145139 A1 * 5/2020 Merlin .................. H04L 1/1812
2020/0322091 A1 * 10/2020 Noh ...................... H04L 1/0047
2023/0198696 A1 * 6/2023 Huang .................. H04L 1/0045 370/329

* cited by examiner

*Primary Examiner* — Noel R Beharry
*Assistant Examiner* — Phillip J Kearns
(74) *Attorney, Agent, or Firm* — Schwegman Lundberg & Woessner, P.A.

(57) ABSTRACT

An apparatus and system for decreasing packet error rate (PER) in a station (STA) are described. The STA determines that an Extremely High Throughput (EHT) physical layer protocol data unit (PPDU) is to be constructed for transmission and that Low-Density Parity-Check (LDPC) encoding is to be used to encode a data field of the EHT PPDU. In response, the STA constructs the EHT PPDU in accordance with a construction constraint of the data field of the EHT PPDU when a LDPC codeword (CW) size 648 is to be used for the data field of the EHT PPDU. The construction constraint includes using bit level interleaving or preventing use of LDPC CW size 648 for a modulation coding scheme (MCS) that is larger than 256 quadrature amplitude modulation (QAM) or 64 QAM or for all QAMs.

14 Claims, 6 Drawing Sheets

LOW-DENSITY PARITY-CHECK RATE MATCHING IN COMMUNICATION SYSTEMS

TECHNICAL FIELD

Some embodiments relate to wireless local area networks (WLANs). Some embodiments relate to WLAN communications in accordance with the IEEE 802.11be draft standard (i.e., Extremely High Throughput (EHT)). In particular, some embodiments relate to Low-Density Parity-Check (LDPC) rate matching in wireless communications.

BACKGROUND

The use and complexity of wireless systems has increased due to both an increase in the types of devices (STAs) using network resources as well as the amount of data and bandwidth being used by various applications, such as video streaming, operating on these STAs. With the vast increase in number and diversity of communication devices, the corresponding network environment, including both devices and communication protocols has increased in complexity. As expected, a number of issues abound with the advent of any new technology, including the use of LDPC.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
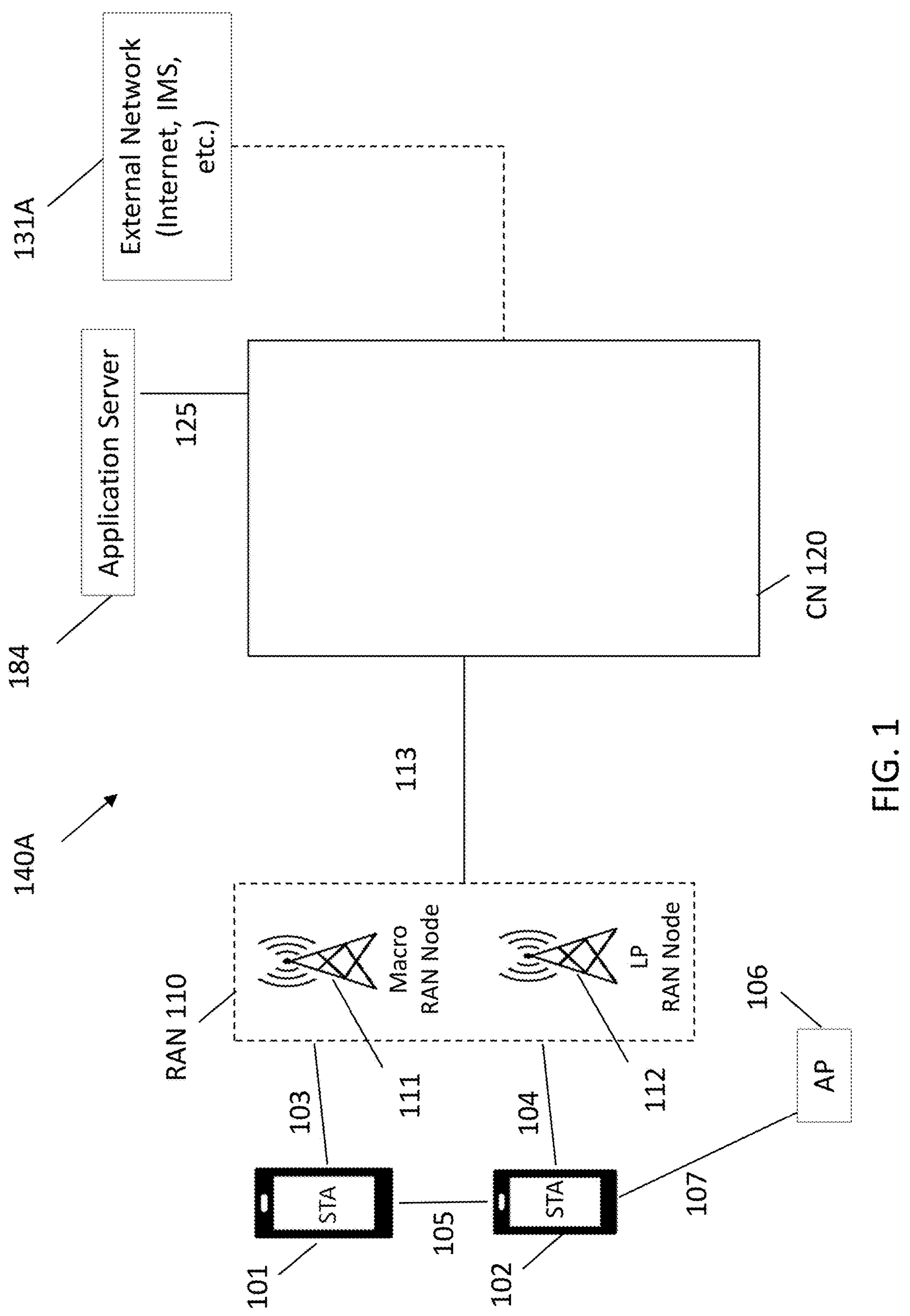
FIG. 1 illustrates an architecture of a network, in accordance with some aspects.

FIG. 1 illustrates an architecture of a network in accordance with some aspects. The network 140A includes network function that may include IEEE 802.11 or 3GPP (LTE/4G/5G/6G functions). A network function can be implemented as a discrete network element on a dedicated hardware, as a software instance running on dedicated hardware, and/or as a virtualized function instantiated on an appropriate platform, e.g., dedicated hardware or a cloud infrastructure.

The network 140A includes STA 101 and STA 102. The STAs 101 and 102 are illustrated as smartphones (e.g., handheld touchscreen mobile computing devices connectable to one or more cellular networks) but may also include any mobile or non-mobile computing device, such as portable (laptop) or desktop computers, wireless handsets, drones, or any other computing device including a wired and/or wireless communications interface. The STAs 101 and 102 can be collectively referred to herein as STA 101, and STA 101 can be used to perform one or more of the techniques disclosed herein.

Any of the radio links described herein (e.g., as used in the network 140A or any other illustrated network) may operate according to any exemplary radio communication technology and/or standard. Any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and other frequencies and Spectrum Access System (SAS) in 3.55-3.7 GHz and other frequencies). Different Single Carrier or Orthogonal Frequency Domain Multiplexing (OFDM) modes (CP-OFDM, SC-FDMA, SC-OFDM, filter bank-based multicarrier (FBMC), OFDMA, etc.), and in particular 3GPP NR, may be used by allocating the OFDM carrier data bit vectors to the corresponding symbol resources.

In some aspects, any of the STAs 101 and 102 can comprise an Internet-of-Things (IoT) STA or a Cellular IoT (CIoT) STA, which can comprise a network access layer designed for low-power IoT applications utilizing short-lived STA connections. In some aspects, any of the STAs 101 and 102 can include a narrowband (NB) IoT STA (e.g., such as an enhanced NB-IoT (eNB-IoT) STA and Further Enhanced (FeNB-IoT) STA). An IoT STA can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT STAs, which may include uniquely identifiable embedded computing devices (within the Internet infrastructure), with short-lived connections. The IoT STAs may execute background applications (e.g., keep-alive messages, status updates, etc.) to facilitate the connections of the IoT network. In some aspects, any of the STAs 101 and 102 can include enhanced MTC (eMTC) STAs or further enhanced MTC (FeMTC) STAs.

The STAs 101 and 102 may be configured to connect, e.g., communicatively couple, with an access point (AP) such as a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN. The RAN 110 may contain one or more NodeBs, one or more of which may be implemented by multiple units. In some embodiments, the STAs 101 and 102 may communicate directly with each other (no network link) through a direct link 105.

Each of the APs may implement protocol entities in the desired protocol stack, e.g., Physical (PHY), Medium Access Control (MAC), Radio Link Control (RLC), Packet Data Convergence Control (PDCP), and Radio Resource Control (RRC)/Service Data Adaptation Protocol (SDAP) (for the control plane/user plane). For 3GPP, the protocol layers may be distributed in different units—a Central Unit (CU), at least one Distributed Unit (DU), and a Remote Radio Head (RRH). The CU may provide functionalities such as the control the transfer of user data, and effect mobility control, radio access network sharing, positioning, and session management, except those functions allocated exclusively to the DU. The higher protocol layers (PDCP and RRC for the control plane/PDCP and SDAP for the user plane) may be implemented in the CU, and the RLC and MAC layers may be implemented in the DU. The PHY layer may be split, with the higher PHY layer also implemented in the DU, while the lower PHY layer is implemented in the RRH. The CU, DU and RRH may be implemented by different manufacturers, but may nevertheless be connected by the appropriate interfaces therebetween. The CU may be connected with multiple DUs.

The STAs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with one or more cellular communications protocols. The STA 102 is shown to be configured to access another AP 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more nodes 111 and 112 that enable the connections 103 and 104. These nodes 111 and 112 can comprise ground stations (e.g., terrestrial access points) or satellite stations providing coverage within a geographic area (e.g., a cell), for example. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the STAs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a gNB, an eNB, or another type of RAN node.

The RAN 110 is shown to be communicatively coupled to a core network (CN) 120 through link 113. In aspects, the CN 120 may be an evolved packet core (EPC) network, a NextGen Packet Core (NPC) network, or some other type of CN. Data packets may be routed between the CN 120 and external networks such as a network including the application server 184 (alternatively referred to as application function (AF)) via an Internet Protocol (IP) interface 125. The application server 184 can also be configured to support one or more communication services (e.g., Voice-over-Internet Protocol (VoIP) sessions, PTT sessions, group communication sessions, social networking services, etc.) for the STAs 101 and 102 via the CN 120. The CN 120 can also communicate data to other external networks 131A, which can include the Internet, IP multimedia subsystem (IPS) network, and other networks.

Figure 2:
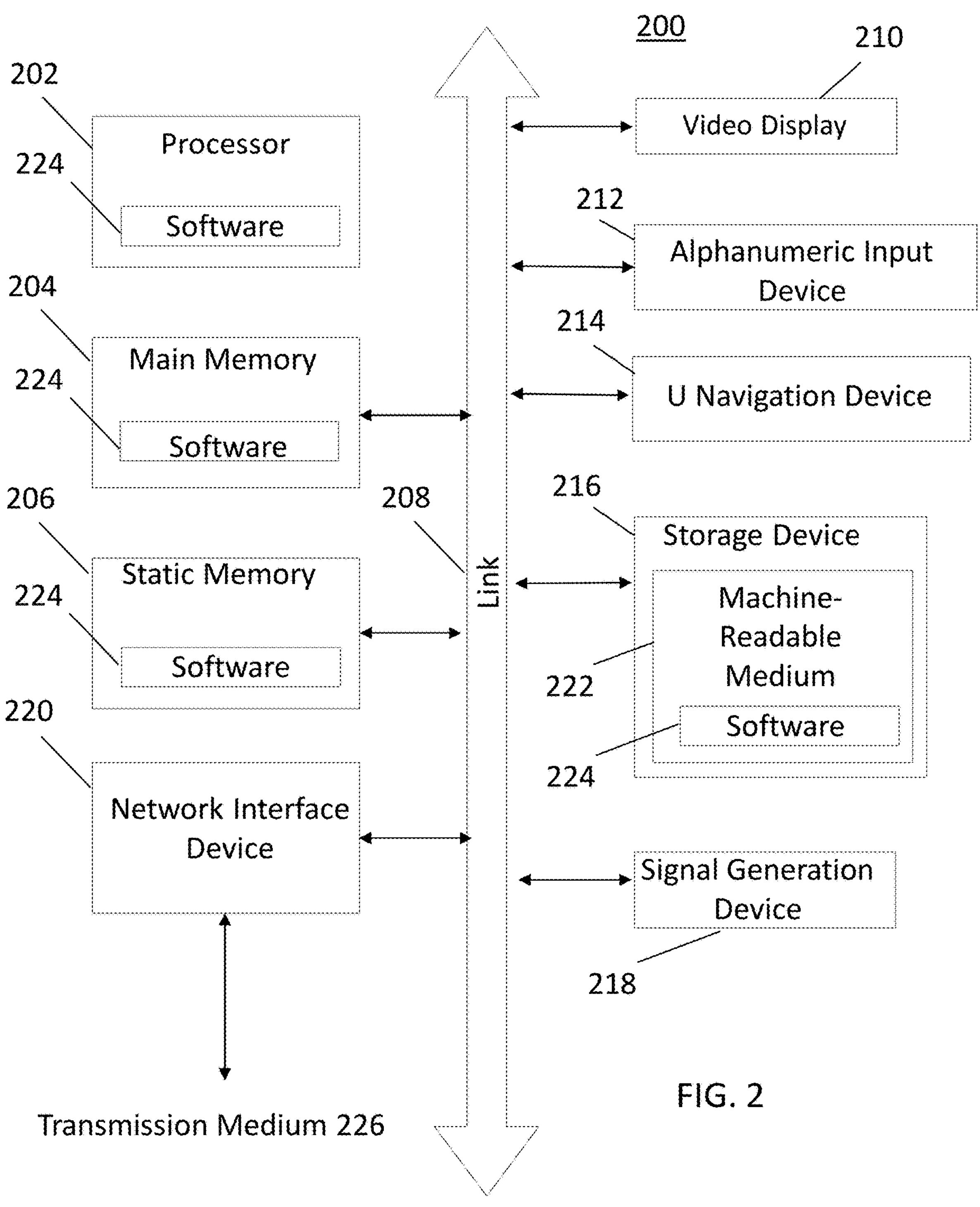
FIG. 2 illustrates a block diagram of a communication device in accordance with some embodiments.

FIG. 2 illustrates a block diagram of a communication device in accordance with some embodiments. The communication device 200 may be a STA such as a specialized computer, a personal or laptop computer (PC), a tablet PC, or a smart phone, dedicated network equipment such as an eNB, a server running software to configure the server to operate as a network device, a virtual device, or any machine capable of executing instructions (sequential or otherwise) that specify actions to be taken by that machine. For example, the communication device 200 may be implemented as one or more of the devices shown in FIG. 1. Note that communications described herein may be encoded before transmission by the transmitting entity (e.g., STA, gNB) for reception by the receiving entity (e.g., gNB, STA) and decoded after reception by the receiving entity.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 200 may include a hardware processor (or equivalently processing circuitry) 202 (e.g., a central processing unit (CPU), a GPU, a hardware processor core, or any combination thereof), a main memory 204 and a static memory 206, some or all of which may communicate with each other via an interlink (e.g., bus) 208. The main memory 204 may contain any or all of removable storage and non-removable storage, volatile memory or non-volatile memory. The communication device 200 may further include a display unit 210 such as a video display, an alphanumeric input device 212 (e.g., a keyboard), and a user interface (UI) navigation device 214 (e.g., a mouse). In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors, such as a global positioning system (GPS) sensor, compass, accelerometer, or other sensor. The communication device 200 may further include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a non-transitory machine readable medium 222 (hereinafter simply referred to as machine readable medium) on which is stored one or more sets of data structures or instructions 224 (e.g., software) embodying or utilized by any one or more of the techniques or functions described herein. The instructions 224 may also reside, completely or at least partially, within the main memory 204, within static memory 206, and/or within the hardware processor 202 during execution thereof by the communication device 200. While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the communication device 200 and that cause the communication device 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks.

The instructions 224 may further be transmitted or received over a communications network using a transmission medium 226 via the network interface device 220 utilizing any one of a number of wireless local area network (WLAN) transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as Institute of Electrical and Electronics Engineers (IEEE) 802.11 family of standards known as Wi-Fi, IEEE 802.16 family of standards known as WiMax, IEEE 802.15.4 family of standards, a Long Term Evolution (LTE) family of standards, a Universal Mobile Telecommunications System (UMTS) family of standards, peer-to-peer (P2P) networks, a next generation (NG)/5$^{th}$ generation (5G) standards among others. In an example, the network interface device 220 may include one or more physical jacks (e.g., Ethernet, coaxial, or phone jacks) or one or more antennas to connect to the transmission medium 226.

Note that the term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" or "processor" as used herein thus refers to, is part of, or includes circuitry capable of sequentially and automatically carrying out a sequence of arithmetic or logical operations, or recording, storing, and/or transferring digital data. The term "processor circuitry" or "processor" may refer to one or more application processors, one or more baseband processors, a physical central processing unit (CPU), a single- or multi-core processor, and/or any other device capable of executing or otherwise operating computer-executable instructions, such as program code, software modules, and/or functional processes.

Any of the radio links described herein may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, etc.), 3GPP 5G, 5G New Radio (5G NR), 3GPP 5G New Radio, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (WITS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p or IEEE 802.11bd and other) Vehicle-to-Vehicle (V2V) and Vehicle-to-X (V2X) and Vehicle-to-Infrastructure (V21) and Infrastructure-to-Vehicle (I2V) communication technologies, 3GPP cellular V2X, DSRC (Dedicated Short Range Communications) communication systems such as Intelligent-Transport-Systems and others (typically operating in 5850 MHz to 5925 MHz or above (typically up to 5935 MHz following change proposals in CEPT Report 71)), the European ITS-G5 system (i.e. the European flavor of IEEE 802.11p based DSRC, including ITS-G5A (i.e., Operation of ITS-G5 in European ITS frequency bands dedicated to ITS for safety re-lated applications in the frequency range 5,875 GHz to 5,905 GHz), ITS-G5B (i.e., Operation in European ITS frequency bands dedicated to ITS non-safety applications in the frequency range 5,855 GHz to 5,875 GHz), ITS-G5C (i.e., Operation of ITS applications in the frequency range 5,470 GHz to 5,725 GHz)), DSRC in Japan in the 700 MHz band (including 715 MHz to 725 MHz), IEEE 802.11bd based systems, etc.

Aspects described herein can be used in the context of any spectrum management scheme including dedicated licensed spectrum, unlicensed spectrum, license exempt spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System/CBRS=Citizen Broadband Radio System in 3.55-3.7 GHz and further frequencies). Applicable spectrum bands include IMT (International Mobile Telecommunications) spectrum as well as other types of spectrum/bands, such as bands with national allocation (including 450-470 MHz, 902-928 MHz (note: allocated for example in US (FCC Part 15)), 863-868.6 MHz (note: allocated for example in European Union (ETSI EN 300 220)), 915.9-929.7 MHz (note: allocated for example in Japan), 917-923.5 MHz (note: allocated for example in South Korea), 755-779 MHz and 779-787 MHz (note: allocated for example in China), 790-960 MHz, 1710-2025 MHz, 2110-2200 MHz, 2300-2400 MHz, 2.4-2.4835 GHz (note: it is an ISM band with global availability and it is used by Wi-Fi technology family (11b/g/n/ax) and also by Bluetooth), 2500-2690 MHz, 698-790 MHz, 610-790 MHz, 3400-3600 MHz, 3400-3800 MHz, 3800-4200 MHz, 3.55-3.7 GHz (note: allocated for example in the US for Citizen Broadband Radio Service), 5.15-5.25 GHz and 5.25-5.35 GHz and 5.47-5.725 GHz and 5.725-5.85 GHz bands (note: allocated for example in the US (FCC part 15), consists four U-NII bands in total 500 MHz spectrum), 5.725-5.875 GHz (note: allocated for example in EU (ETSI EN 301 893)), 5.47-5.65 GHz (note: allocated for example in South Korea, 5925-7125 MHz and 5925-6425 MHz band (note: under consideration in US and EU, respectively. Next generation Wi-Fi system is expected to include the 6 GHz spectrum as operating band but it is noted that, as of December 2017, Wi-Fi system is not yet allowed in this band. Regulation is expected to be finished in 2019-2020 time frame), IMT-advanced spectrum, IMT-2020 spectrum (expected to include 3600-3800 MHz, 3800-4200 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), 57-64/66 GHz (note: this band has near-global designation for Multi-Gigabit Wireless Systems (MGWS)/WiGig. In US (FCC part 15) allocates total 14 GHz spectrum, while EU (ETSI EN 302 567 and ETSI EN 301 217-2 for fixed P2P) allocates total 9 GHz spectrum), the 70.2 GHz-71 GHz band, any band between 65.88 GHz and 71 GHz, bands currently allocated to automotive radar applications such as 76-81 GHz, and future bands including 94-300 GHz and above. Furthermore, the scheme can be used on a secondary basis on bands such as the TV White Space bands (typically below 790 MHz) where in particular the 400 MHz and 700 MHz bands are promising candidates. Besides cellular applications, specific applications for vertical markets may be addressed such as PMSE (Program Making and Special Events), medical, health, surgery, automotive, low-latency, drones, etc. applications.

As above, LDPC codes are iterative linear error correction codes that are used correct for transmission errors. LDPC corrects channel errors by maintaining parity bits for a selection of the data bits. Data bits are backed by multiple parity bits; when a parity check failure is detected, information from the parity bits can be used to retrieve the original data bit. In some cases, the LDPC coded signals can be generated by puncturing—removing some of the parity bits after encoding with the error-correction code to fit a particular rate matching size.

Figure 3:
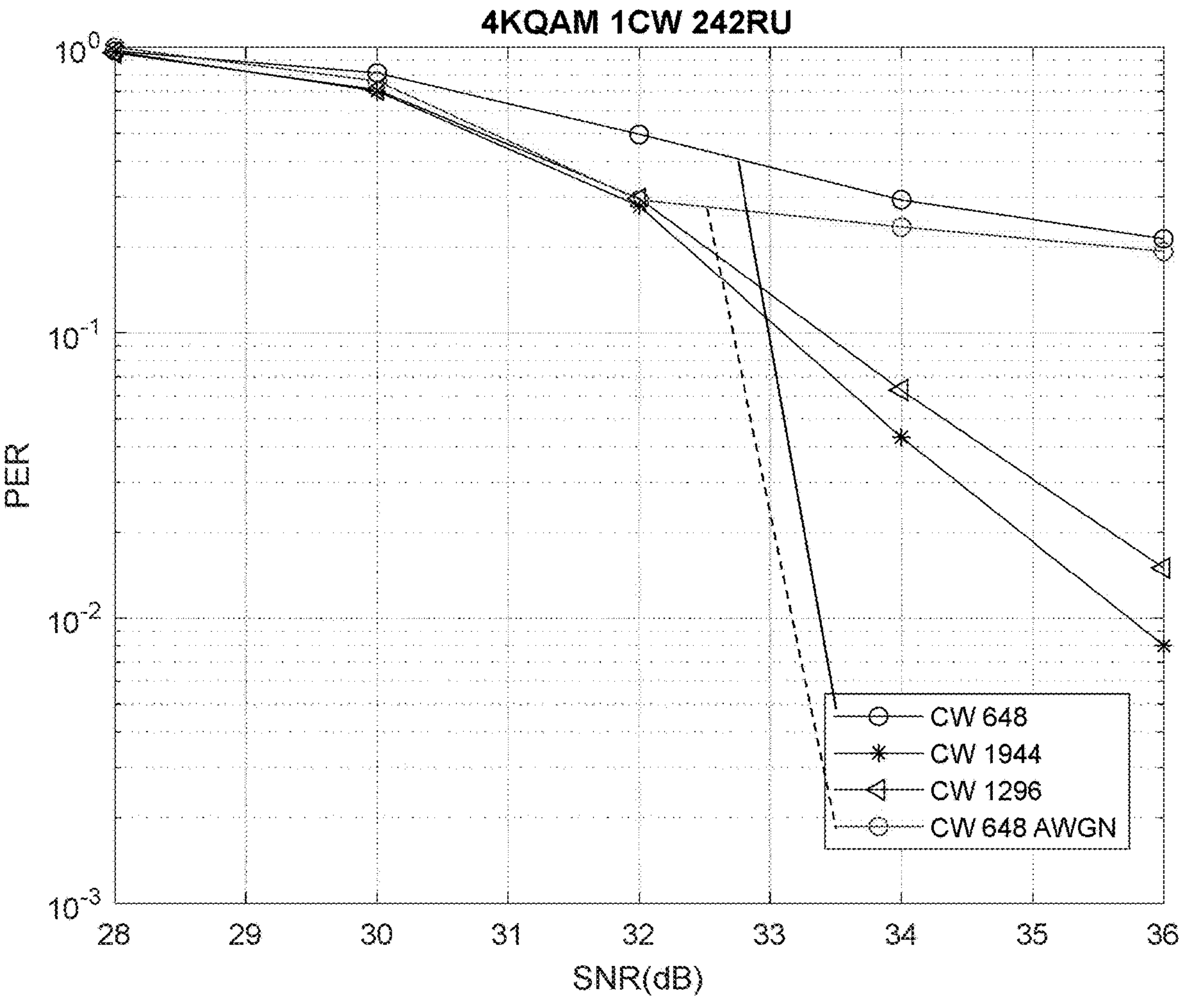
FIG. 3 illustrates performance of LDPC codeword size for 4096 quadrature amplitude modulation (QAM) in accordance with some embodiments.

However, an LDPC code of codeword (CW) size 648 in high order modulation (4096 QAM and 1024 QAM) may have a high error floor. The error floor is the bottom of the performance curve of the LDPC coding scheme. FIG. 3 illustrates performance of LDPC codeword size for 4096 QAM in accordance with some embodiments. As shown in FIG. 3, the error floor is present for both the fading channel and Additive white Gaussian noise (AWGN). That is, as shown, the packet error rate (PER) effectively levels off so that the PER is essentially independent of the signal-to-noise ratio (SNR). The reason is in high order modulation, more least significant bits (LSBs) are weakly protected (noise more easily affects the LSBs due to the encoding). If the CW size is short, there is higher chance that LSBs fall into a loop in the belief passing decoding, such that the error messages are passed within in the loop and cannot be corrected.

In some embodiments, a bit level interleaver is added after channel coding. An interleaver maps a transmitted sequence to an encoding/decoding sequence (including user and parity) and a de-interleaver maps the encoding/decoding sequence to the transmitted sequence.

One tool to avoid a long run of LSBs (contiguous number of LSBs compared with lower QAM) is to use a bit level interleaver such that the coded bits are mapped to constellations more randomly to avoid the LSB run. A binary convolutionally encoded (BCC) interleaver, such as that defined in IEEE 802.11ax/11n can be reused and proved to reduce or eliminate the error floor issue significantly. The interleaving is defined using three permutations. The first permutation is defined by:

$$i=N_{Row}\times(k \bmod N_{COL})+\lfloor k/N_{COL}\rfloor, k=0,1, \ldots, N_{CBPSS}(i_{ss})-1$$

The second permutation is defined by:

$$j=s(i_{ss})\times\lfloor s(i_{ss})\rfloor+(i+N_{CBPSS}(i_{ss})-\lfloor N_{COL}\times i/N_{CBPSS}(i_{ss})\rfloor) \bmod s(i_{ss}), i=0,1, \ldots, N_{CBPSS}(i_{ss})-1$$

Figure 4:
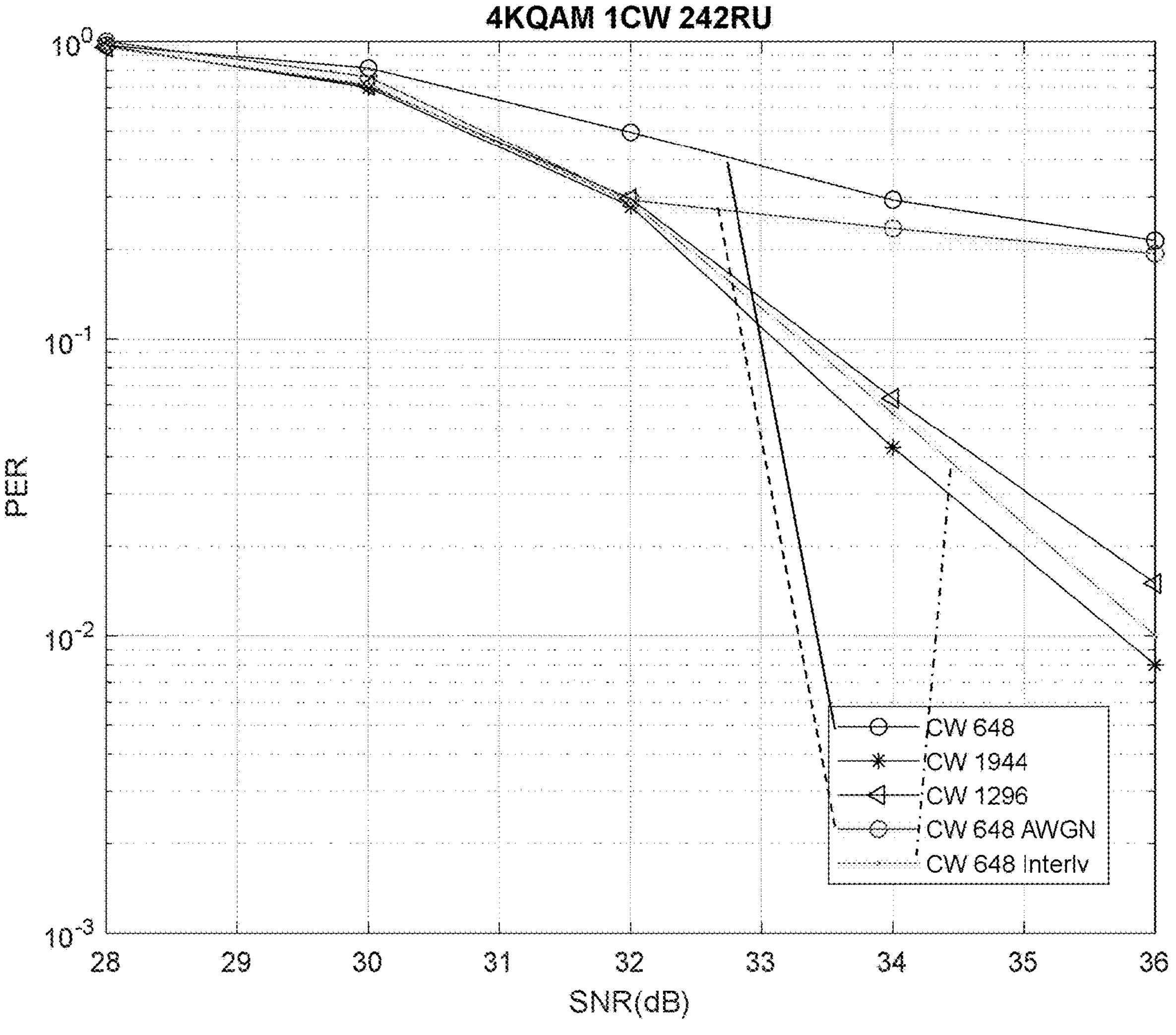
FIG. 4 illustrates a performance comparison after adding a bit level interleaver according to some embodiments.

The second permutation may be used to randomize the LSBs. FIG. 4 illustrates a performance comparison after adding a bit level interleaver according to some embodiments. The performance curve of CW size 648 with a bit level interleaver shows significant gain, with the effects similar to using a longer CW. In some embodiments, a bit level interleaver other than the BCC interleaver can be considered before modulating the encoded bits to QAM.

Figure 5:
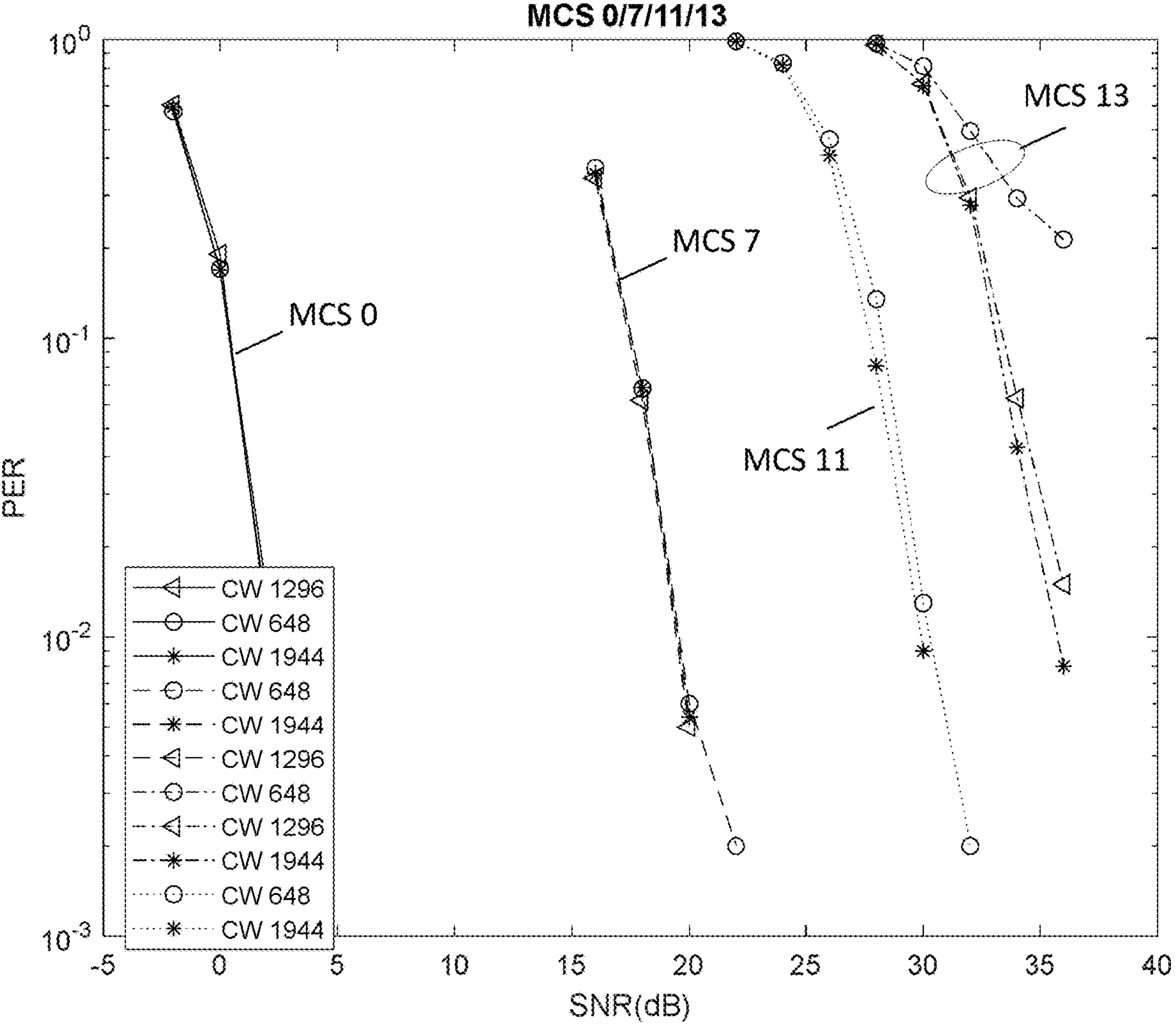
FIG. 5 illustrates a performance comparison of different codeword sizes for LDPC according to some embodiments.

In some embodiments, a CW size 648 may simply not be used in LDPC encoding. FIG. 5 illustrates a performance comparison of different codeword sizes for LDPC according to some embodiments. As is shown in FIG. 5, CW size 648 doesn't show a significant performance gain over the use of larger CW. Even when a low modulation coding scheme (MCS) is used (MCS 0=BPSK; MCS 7=64 QAM; MCS 11=1024 QAM; MCS 13=4096 QAM), the PER performance is a bit worse when using CW size 648 than other larger CW sizes in FIG. 5. Given the degradation in higher order modulation (most noticeable in 4096 QAM, but also present in 1024 QAM in FIG. 5), it may be desirable to only enable use of two CW sizes and disallow CW size 648.

In other embodiments, a CW size 648 may be limited in LDPC encoding such that this size is used only for low order modulation. In this case, as CW size 648 has significant performance loss for both 1024QAM and 4096QAM as shown in FIG. 5, CW size 648 may be permitted only up to a predetermined MCS/QAM level, for example up to 256QAM or up to 64QAM. The predetermined MCS/QAM level may be determined by the difference in the PER for a particular SNR (e.g., >5 or 10% being unacceptable).

Figure 6:
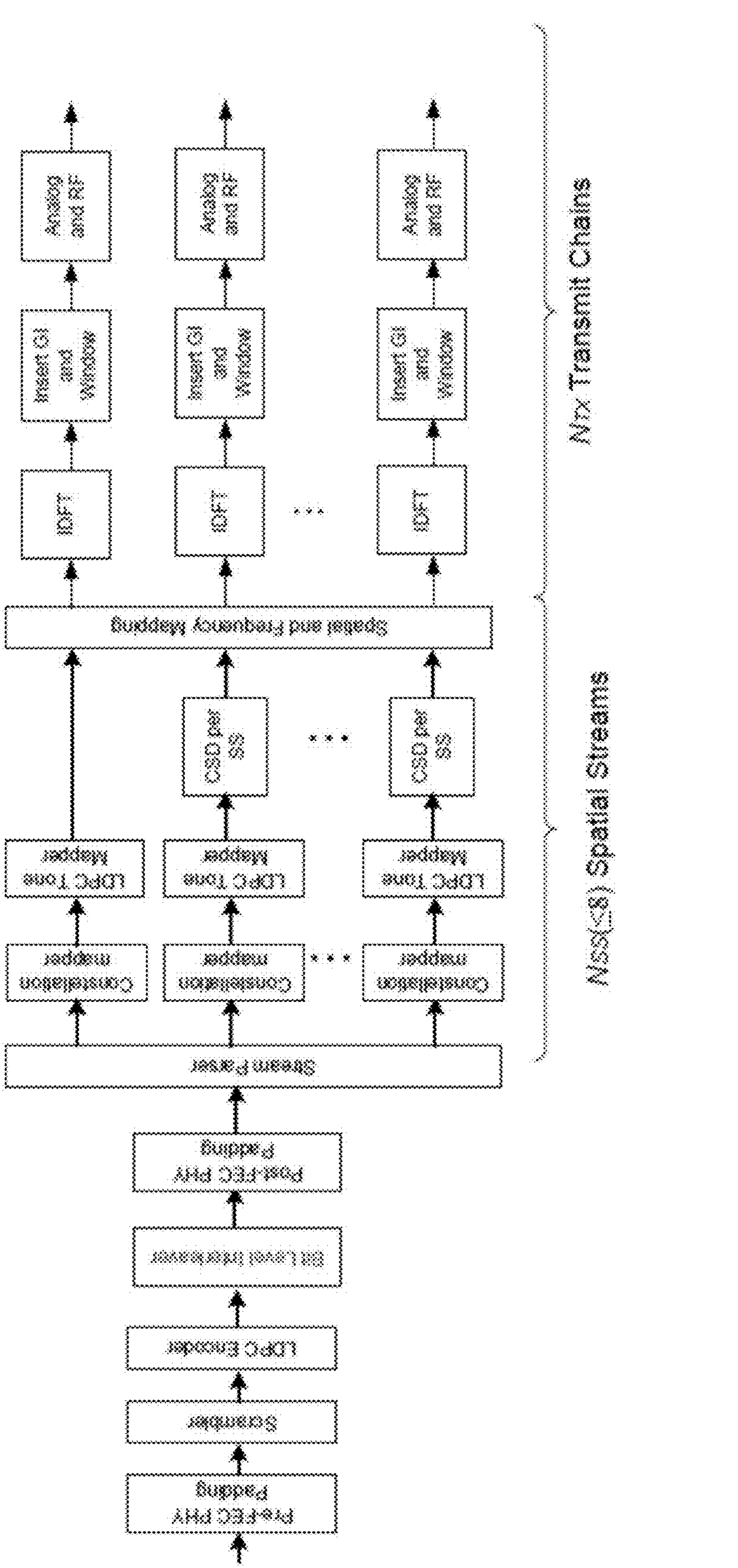
FIG. 6 illustrates a transmitter block diagram according to some embodiments.

FIG. 6 illustrates a transmitter block diagram according to some embodiments. In general, the communication device (e.g., STA, AP) includes a transceiver that has a receiver and a transmitter. The transmitter includes a modulator, one or more intermediate frequency (IF) stages, and a power amplifier. The modulator converts data into baseband signals in accordance with a wireless communication standard used to communicate the data over the air. The modulator may contain an encoder that provides error correction and channel coding and symbol mapper that maps the encoded data. The IF stages mix the baseband signals with one or more local oscillation (LO) signals to produce RF signals. The power amplifier amplifies the RF signals prior to transmission via one or more antennas.

The receiver, similarly, is coupled to one or more antennas and includes a low noise amplifier (LNA), one or more IF stages, one or more filters, and a recovery stage, among others. The LNA amplifies RF signals received from the antenna. The IF stages mix the amplified RF signals with one or more LO signals to convert the amplified RF signal into baseband signals, in some cases through IF signals. The filter may be a lowpass filter or bandpass filter that filters the converted signals to produce filtered signals. The recovery stage recovers data from the filtered signals in accordance with the particular wireless communication standard, and may include a decoder and symbol demapper that operates in substantially the opposite manner as the encoder and symbol mapper.

The transmitter generates an EHT physical layer protocol data unit (PPDU) with multiple fields. During transmission, a PLCP Service Data Unit (PSDU) (in the SU case) or one or more PSDUs (in the MU case) are processed (i.e., scrambled and coded) and appended to the PHY preamble to create the PPDU. At the receiver, the PHY preamble is processed to aid in the detection, demodulation, and delivery of the PSDU. As shown in FIG. 6, the transmitter block diagram for an uplink transmission or downlink (non-MU-MIMO) transmission of a data field with LDPC encoding on a resource unit (RU) or multi RU (MRU) that is the same size or smaller than a 996-tone RU. FIG. 6 applies to the data field of an EHT MU PPDU that is transmitted on an RU or MRU allocated to a single user and the sata field of an EHT TB PPDU (whether or not it is spatially multiplexed with other users). The stages include a Pre-forward error correction (FEC) PHY padding stage, a scrambler, a FEC (BCC or LDPC) encoder, a bit level interleaver (if present), a Post-FEC PHY padding stage, a stream parser that parses the data stream into multiple spatial streams, and for each stream: a constellation mapper, a LDPC tone mapper, a cyclic shift diversity (CSD) per spatial stream (SS) insertion stage, a Spatial and Frequency mapper, an inverse DFT, a guard interval (GI) insertion and window, and an analog and RF output stage.

To construct the data field in an EHT PPDU, a service field is constructed, and the PSDU appended to the service field. The pre-FEC padding bits are then appended. The pre-FEC padded data is scrambled and LDPC encoded. The bits are then interleaved. The post-FEC padded bits and the PE field are appended to the interleaved bits. The output is rearranged into blocks and parsed into spatial streams. Each stream is mapped to BPSK, BPSK-DCM, QPSK, 16-QAM, 64-QAM, 256-QAM, 1024-QAM, or 4096-QAM constellation points and then LDPC tone mapping is performed on all LDPC encoded streams. CSD is applied for each spatial stream and the Q matrix applied. The signal from all users in each RU is combined at this point. The IDFT is computed. A GI determined by the TXVECTOR parameter GI TYPE is prepended and windowing applied. The resulting complex baseband waveform with each transmit chain is upconverted to an RF signal according to the center frequency of the desired channel and then transmitted.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The subject matter may be referred to herein, individually and/or collectively, by the term "embodiment" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, STA, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus for a station (STA), the apparatus comprising:

processing circuitry configured to:

determine that an Extremely High Throughput (EHT) physical layer protocol data unit (PPDU) is to be constructed for transmission;

determine that Low-Density Parity-Check (LDPC) encoding is to be used to encode a data field of the EHT PPDU;

construct the EHT PPDU in accordance with a construction constraint of the data field of the EHT PPDU that is based on a LDPC codeword (CW) size to be used for the data field of the EHT PPDU; and configure the STA to transmit the EHT PPDU; and a memory configured to store the EHT PPDU, wherein, as the construction constraint, in response to a determination that the LDPC encoding is to be used to encode the data field of the EHT PPDU, the processing circuitry is further configured to limit LDPC CW sizes used to construct the data field of the EHT PPDU as the construction constraint, and wherein the processing circuitry is configured to limit, as the construction constraint, the LDPC CW sizes used to construct the data field of the EHT PPDU to greater than LDPC CW size 648 for a modulation coding scheme (MCS) greater than 256 quadrature amplitude modulation (QAM).

2. The apparatus of claim 1, wherein, in response to a determination that LDPC encoding is to be used, the processing circuitry is further configured to limit application of the construction constraint to predetermined modulation coding schemes (MCSs) used for the EHT PPDU.

3. The apparatus of claim 2, wherein the predetermined MCSs comprise quadrature amplitude modulations (QAMs) larger than 256QAM.

4. The apparatus of claim 2, wherein the predetermined MCSs comprise quadrature amplitude modulations (QAMs) larger than 64QAM.

5. The apparatus of claim 1, wherein, as the construction constraint, in response to a determination that the LDPC encoding is to be used to encode the data field of the EHT PPDU, the processing circuitry is further configured to apply bit level interleaving as the construction constraint.

6. The apparatus of claim 5, wherein the processing circuitry is configured to apply the bit level interleaving after the LDPC encoding.

7. The apparatus of claim 5, wherein the processing circuitry is configured to apply the bit level interleaving immediately subsequent to the LDPC encoding.

8. The apparatus of claim 5, wherein the bit level interleaving is performed by a binary convolutionally encoded (BCC) interleaver.

9. The apparatus of claim 1, wherein in response to a determination that the LDPC encoding is to be used to encode the data field of the EHT PPDU, the processing circuitry is configured to apply the construction constraint to increase protection of least significant bits (LSBs) of data for the data field of the EHT PPDU dependent on a modulation coding scheme (MCS) used.

10. A non-transitory computer-readable storage medium that stores instructions for execution by one or more processors of a station (STA), the one or more processors to configure the STA to, when the instructions are executed:

determine that an Extremely High Throughput (EHT) physical layer protocol data unit (PPDU) is to be constructed for transmission;

determine that Low-Density Parity-Check (LDPC) encoding is to be used to encode a data field of the EHT PPDU;

construct the EHT PPDU in accordance with a construction constraint of the data field of the EHT PPDU that is based on a LDPC codeword (CW) size to be used for the data field of the EHT PPDU, wherein, in response to a determination that the LDPC encoding is to be used to encode the data field of the EHT PPDU, the construction constraint limits the LDPC CW sizes used to construct the data field of the EHT PPDU to greater than LDPC CW size 648 for a modulation coding scheme (MCS) greater than 256 quadrature amplitude modulation (QAM); and configure the STA to transmit the EHT PPDU.

11. The non-transitory computer-readable storage medium of claim 10, wherein the instructions, when executed, further configure the STA to limit application of the construction constraint to a modulation coding scheme (MCS) used for the EHT PPDU to larger than a predetermined quadrature amplitude modulation (QAM) selected from a group of QAMS that include 256QAM and 64QAM.

12. The non-transitory computer-readable storage medium of claim 10, wherein the instructions, when executed, further configure the STA to apply, as the construction constraint in response to a determination that the LDPC encoding is to be used to encode the data field of the EHT PPDU, bit level interleaving.

13. The non-transitory computer-readable storage medium of claim 12, wherein the instructions, when executed, further configure the STA to apply the bit level interleaving immediately subsequent to the LDPC encoding.

14. A method of decreasing packet error rate (PER) in a station (STA), the method comprising:

determining that an Extremely High Throughput (EHT) physical layer protocol data unit (PPDU) is to be constructed for transmission;

determining that Low-Density Parity-Check (LDPC) encoding is to be used to encode a data field of the EHT PPDU;

constructing the EHT PPDU in accordance with a construction constraint of the data field of the EHT PPDU that is applied in response to determining that a LDPC codeword (CW) size 648 is to be used for the data field of the EHT PPDU and preventing use of LDPC CW size 648 for a modulation coding scheme (MCS) for the EHT PPDU that is larger than 256 quadrature amplitude modulation (QAM); and transmitting the EHT PPDU.

* * * * *